United States Patent [19]

Aikens

[11] Patent Number: 5,394,251
[45] Date of Patent: Feb. 28, 1995

[54] CUSTOMER SCHEDULABLE MACHINE QUALITY ADJUST

[75] Inventor: Andrew J. Aikens, Webster, N.Y.

[73] Assignee: Xerox Corporation, Stamford, Conn.

[21] Appl. No.: 64,475

[22] Filed: May 21, 1993

[51] Int. Cl.[6] .......................... G03G 13/00; H04N 1/46
[52] U.S. Cl. ..................................... 358/500; 358/405;
358/406; 355/203; 355/206; 355/208
[58] Field of Search ..................... 355/203, 206, 208;
358/500, 405, 406

[56] References Cited

U.S. PATENT DOCUMENTS

| | | | |
|---|---|---|---|
| 5,210,571 | 5/1993 | Peloquin | 355/203 |
| 5,229,815 | 7/1993 | Sulenski | 355/207 |
| 5,270,775 | 12/1993 | Suzuki | 355/204 |

Primary Examiner—Edward L. Coles, Sr.
Assistant Examiner—John Ning
Attorney, Agent, or Firm—Ronald F. Chapuran

[57] ABSTRACT

A method of presetting the time for automatically checking a machine and making quality adjustments in the machine by an image quality monitoring element including the steps of providing a plurality of presetting time options on a screen display of a user interface, selecting a set of preset times to initiate checking the machine by the image quality monitoring element, storing in the controller the set of preset times to initiate checking the machine by the image quality monitoring element, and responding to the set of preset times to activate the image quality monitoring element.

2 Claims, 5 Drawing Sheets

CUSTOMER SCHEDULABLE MACHINE QUALITY ADJUST

BACKGROUND OF THE INVENTION

The invention relates to image quality adjustments and more particularly, to customer schedulable machine quality adjustment in an image reproduction machine.

It is important in the operation of complex electronic equipment such as reproduction machines to maintain the quality of the finished copy sheets. Today's copiers must routinely perform a copy quality (CQ) check to insure that copies will be of the highest quality for the customer. Due to process control requirements, these copy quality checks may occur several times a day. The time when these CQ checks are performed may interrupt the customer's use of the copier for several minutes. This can not only be annoying and inconvenient for the operator, but may impede machine productivity as well. It is important for machine efficiency to minimize the time spent in these CQ checks and adjustments, especially during peak productivity periods. The need for quality adjustments becomes even more crucial in machines adapted for highlight color or full color reproductions since these machines often require more extensive or more frequent analysis and correction to produce a quality color product.

It is known in prior art machines for the machine to cycle down in the middle of a reproduction job to initiate a needed copy quality adjustment. Sometimes manual operator intervention is needed to initiate the quality adjustment or to cycle up and return the machine from the adjustment phase to resume completing the reproduction job. This type of required operator attention is particularly inefficient. In addition, it is known in the prior art for example in D/92323, U.S. Ser. No. 07/940,257 to provide a plurality of time delays for adjusting the quality of the image processing apparatus. The time delays include immediately adjusting the quality of the image processing during a current job run, automatically adjusting the quality of the image processing apparatus upon completion of a current job run, and automatically adjusting the quality of the image processing apparatus upon a predetermined time delay depending upon job requirements after completion of a current job. Also, in prior art machines, the machine may simply cycle down after completion of a job when a quality adjustment is needed and require operator initiation of the quality adjustment.

While quality adjustments are necessary to maintain machine quality standards, a truly productive machine must minimize machine downtime for quality checks during peak productivity hours. It would be desirable, therefore, to minimize machine lost productivity during machine quality adjustments. It would also be desirable to be able to automatically initiate a quality adjustment at preset times of known machine inactivity and machine non use. It would also be desirable to allow a machine key operator to selectively set quality adjustments depending upon the nature of the operation or usage demand for a given machine.

It is an object of the present invention, therefore, to provide a new and improved technique to make quality adjustments and corrections in an imaging machine without unnecessary machine downtime. It is still another object of the present invention to be able to selectively schedule the time of copy quality adjustments for a given machine, dependent upon the history or statistical analysis of machine usage and operator demand. Other advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with a method of presetting the time for automatically checking a machine and making quality adjustments in the machine by an image quality monitoring element by providing a plurality of presetting time options on a screen display of a user interface, selecting a set of preset times to initiate checking the machine by the image quality monitoring element, storing in the controller the set of preset times to initiate checking the machine by the image quality monitoring element, and responding to the set of preset times to activate the image quality monitoring element.

For a better understanding of the present invention, reference may be had to the accompanying drawings wherein the same reference numerals have been applied to like parts and wherein:

DETAILED DESCRIPTION OF THE DRAWINGS

Figure 1:
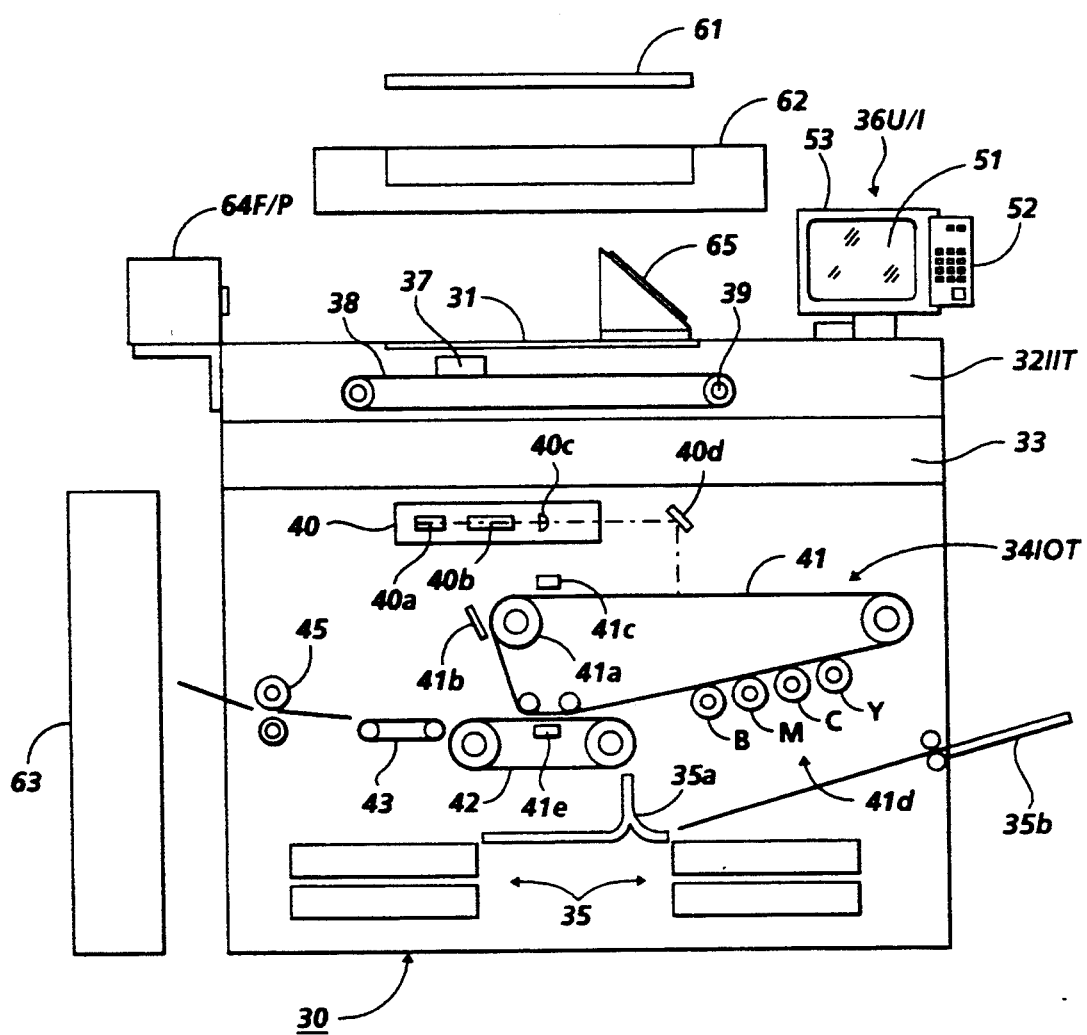
FIG. 1 is a schematic elevational view depicting various operating components and subsystems of a typical machine incorporating the present invention.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DETAILED DESCRIPTION OF THE PREFERRED EMBODIMENT

For a general understanding of the features of the present invention, reference is made to the drawings. In the drawings, like reference numerals have been used throughout to identify identical elements.

FIG. 1 shows one example of the overall construction of a color copying machine to which this Invention is applied. A typical color copying machine to which this Invention is applied is formed with the base machine 30, composed of a platen glass plate 31, which carries the original sheet thereon, an image input terminal (IIT) 32, an electrical control system container 33, the image output terminal (IOT) 34, and a paper tray 35, and a user interface (U/I) 36 and also, as optional items, of an editing pad 61, an automatic document feeder (ADF) 62, a sorter 63, and a film projector (F/P) 64.

Electrical hardware is necessary for performing the control of the IIT, IOT, U/I, etc. mentioned above, and a plural number of boards for control of each of the processing units, such as the IIT, IPS, U/I, F/P, and so forth, which perform the image-forming process for the output signals from the IIT, and these are accommodated further in the electrical control system container 33.

The IIT 32 is composed of an imaging unit 37, the wire 38 for driving the said unit, the driving pulley 39, and so forth, and IIT 32 reads a color original sheet for each of the primary colors B (Blue), G (Green), and R (Red) by means of a CCD line sensor and a color filter provided inside the imaging unit 37, converts the data so obtained into digital image signals and then outputs the signals to the IPS.

In the IPS, the B, G, and R signals mentioned above are transformed into the primary colors of the toner, i.e. Y(Yellow), C(Cyan), M(Magenta), and K(Black), and then, with various data processing being applied to the data so obtained for the purpose of enhancing the reproduction fidelity and fineness, and so forth, the IPS converts the toner signals of the process color in harmonious gradation into binary toner signals and outputs them to the IOT 34.

The IOT 34, which is provided with a scanner 40 and a photosensitive material belt 41, converts the image signals from the above-mentioned IPS into optical signals in the laster output part 40a and forms a latent image corresponding to the image on the original sheet on the photosensitive material belt 41 by way of the polygon mirror 40b, the lens 40c, and the reflexive mirror 40d. The photosensitive material belt 41, which is driven by the driving pulley 41a, has a cleaner 41b, a charging unit 41c, the individual developing devices for Y, M, C, and K, and a transfer device 41e arranged around it. And, opposite to this transfer device 41e is provided a transfer unit 42, which takes into it the sheet that comes transported to it from the paper tray 35 via the paper transport channel 35a and transfers the colors in the order of Y, M, C, and K, the transfer unit 42 being rotated four turns, for example, for full-color copying in four full colors. The sheet of paper on which the image is so transferred is then transported from the transfer unit 42 via the vacuum transport device 43 to the fixing device 45, where it is fixed, and is thereafter discharged from it. Moreover, the paper transport channel 35a is so designed as to accept the paper fed alternatively from the SSI (Single Sheet Inserter) 35b.

The U/I 36 is designed for use by the user for making the selections of the desired functions and for giving instructions regarding the conditions for the execution of the selected functions, and this system is provided with a color display unit 51 and a hardware control panel 52 installed by the side of the said display unit, and it is further combined with an infrared ray touch board 53, so that instructions can be given directly with the "soft buttons" on the screen. For further details reference is made to U.S. Pat. No. 5,032,903 incorporated herein.

Figure 2:
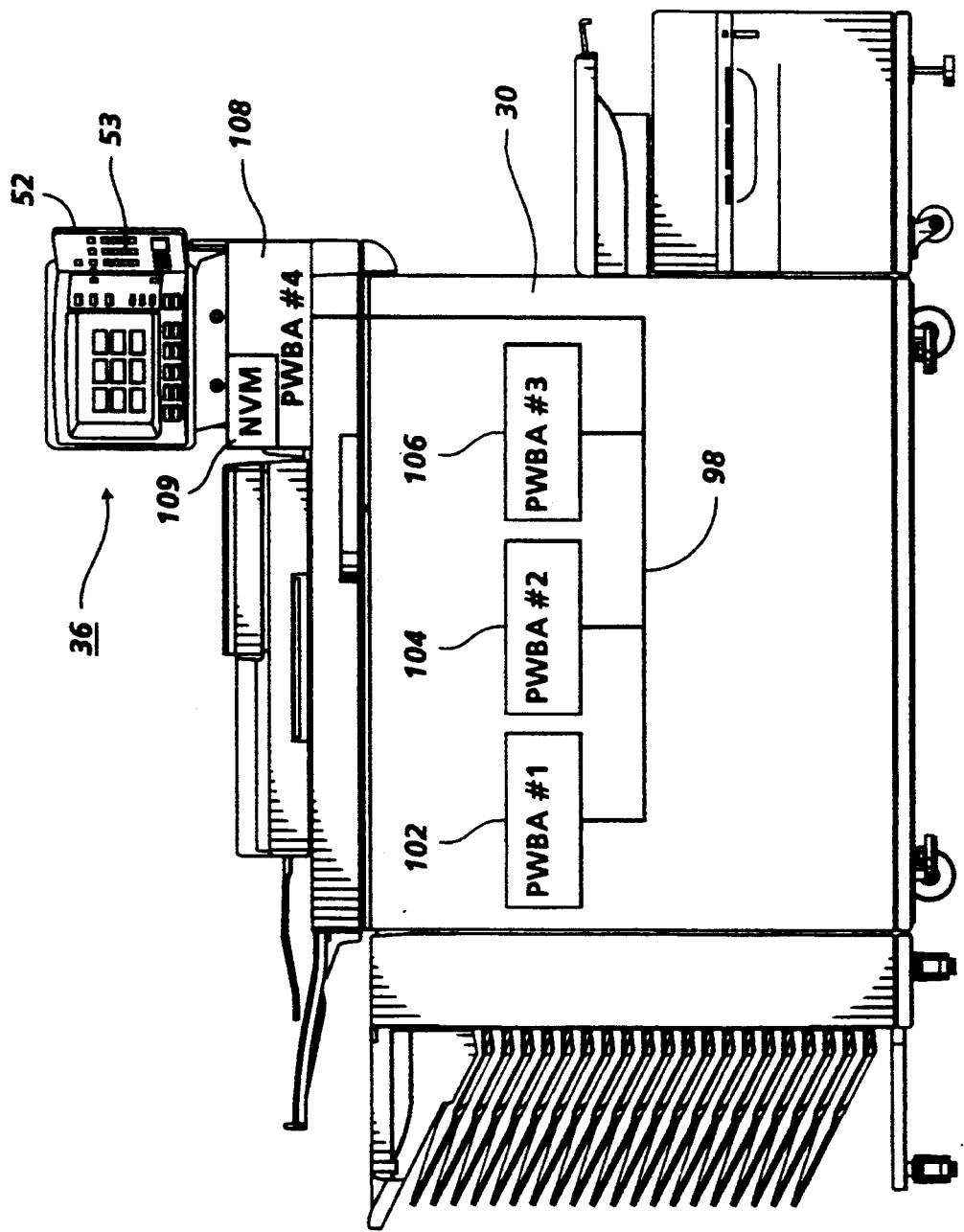
FIG. 2 is a schematic illustrating the control boards for control of the machine shown in FIG. 1.

With reference to FIG. 2, there is illustrated in general block form, the control of the base machine 30 shown in FIG. 1. The base machine is controlled by a plurality of printed wiring boards interconnected to a common channel or bus 98. For purposes of explanation, four printed wiring boards, boards 102, 104, 106 and 108 are illustrated, with printed wiring board 108 being the control for the user interface 36 and the remaining printed wiring boards providing control for predetermined systems and components of the base machine 30. It should be understood that the number of printed wiring boards and the manner of interconnection is merely a design choice and any other suitable control scheme for controlling the base machine is contemplated within the scope of this invention. It should also be noted that one of the printed wiring boards, for example, board 102 could be the master control for the other printed wiring boards or that there could be any number of master slave relationships of the control boards or distributed control of the various functions of the base machine.

Figure 3:
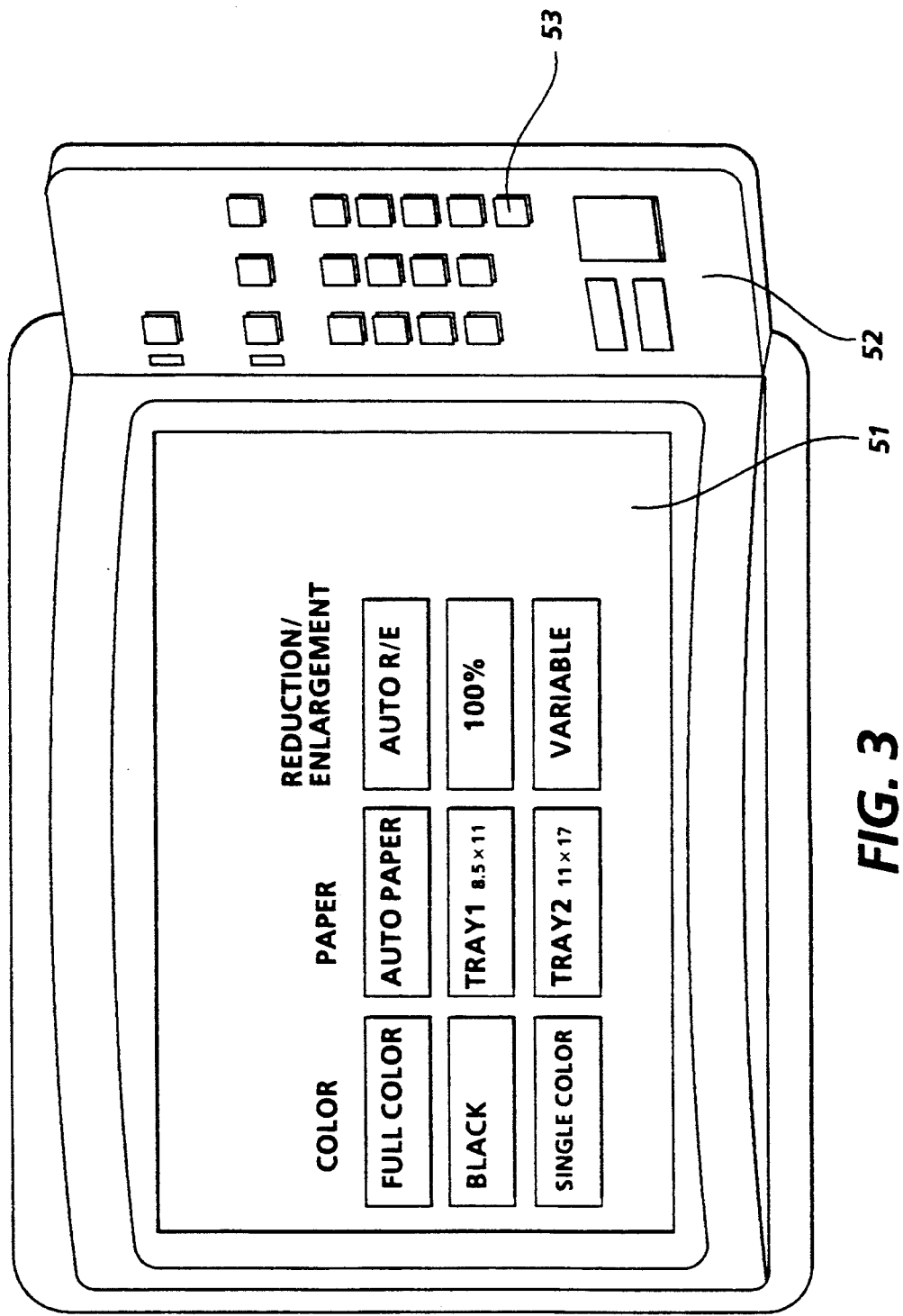
FIG. 3 is an exploded view of the touch monitor screen depicted in FIG. 2.

For purposes of understanding the present invention, it is only necessary to know that the base machine 30 has control software resident on several printed circuit boards that communicate with each other using a common network, and that the base machine 30 has a user interface 36 that is controlled by software that is also part of the common network, illustrated by printed circuit board 108. FIG. 3 is merely a simplified version of the color display unit 51, and hardware control panel 52 of the user interface 36 illustrating various soft control buttons such as full color, auto paper, and auto reduction/enlargement.

Figure 4:
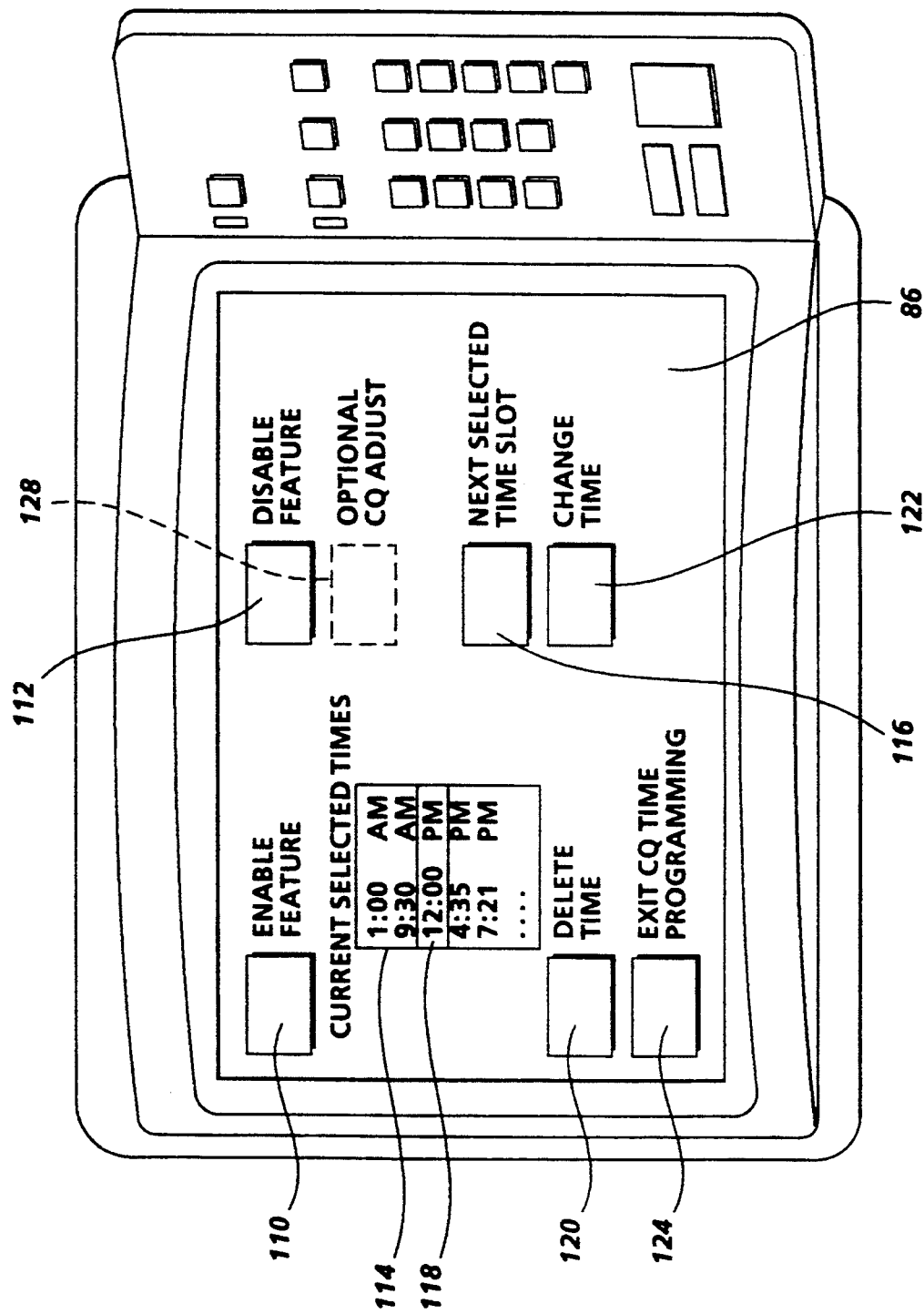
FIG. 4 is a screen display of copy quality adjustment programming in accordance with the present invention.

In accordance with the present invention, with reference to FIG. 4, there is a technique to program or preset the time and frequency of machine quality adjustments to prevent the copier from performing the CQ adjusts at an inconvenient time. These machine adjustments are normally routine and, in a preferred embodiment, a standard machine analysis is performed. However, it is within the scope of the present invention that different levels of machine analysis can be specified. That is, a more in depth analysis of specific components of the machine can be performed at predetermined times different from the routine analysis.

The customer enters the CQ adjust mode by activating a suitable button, such as button 53 shown in FIG. 3. Alternatively, button 53 could be a soft button suitably displayed on screen 51 within an appropriate screen frame for setting various default conditions or providing access to various operator software tools Upon pushing button 53, a suitable frame or screen such as screen 86 displays various options.

The ENABLE FEATURE button 110 and DISABLE FEATURE button 112 provide the operator with the means to enable or disable the automatic CQ adjust feature. CURRENT SELECTED TIME slots, illustrated at 114, displays the current programmed times the customer has previously entered to set the time for the CQ adjust to be performed. Preferably, there is no limit the number of times or slots that can be selected, although 5 are shown here as an example. Clearly, if no times have been preset, the display area 114 will be blank. The NEXT SELECTED TIME SLOT button 116 allows the operator to scroll through the time slots. Currently the 12:00 PM time slot 118 is selected. By striking the NEXT SELECTED TIME button 116, the 4:35 PM time slot would be highlighted.

The DELETE TIME button 120 provides the operator with the mechanism to delete the current highlighted time slot. In other words, as illustrated in FIG. 4, upon striking the DELETE TIME button 120, the operator would eliminate the 12:00 PM time slot 118 from the screen. The CHANGE TIME button 122 allows the operator to change the time for the particular time slot that is highlighted. After selecting the CHANGE TIME button 122, the operator can enter in the desired time. The desired time is entered using any suitable keyboard with numerals such as keys 53 shown in FIG. 2. It is also within the scope of the present invention to provide suitable message prompts on the display screen to assist the operator in CQ adjust programming. For example, a suitable prompt to "enter in the desired time" would be appropriate after the operator has hit the CHANGE TIME button 122.

There is also provided an EXIT CQ TIME PROGRAMMING button 124. Upon pressing this button, a save all changes or store all changes operation is executed. In a preferred embodiment, all preset times are stored in suitable nonvolatile memory (NVM) such as NVM 109 shown in FIG. 2. In addition to saving or storing the preset times, the EXIT CQ TIME PROGRAMMING button 124 initiates the exit from the CQ adjust mode and returns the operator to a suitable frame on screen 51 such as any well known Walk-up frame.

It should be noted that the CURRENT SELECTED TIME slots, illustrated at 114, are listed in chronological order. In a preferred embodiment, by changing a current time slot such as 118, the list will be redisplayed in chronological order after it has been entered. To add an additional time slot to the CURRENT SELECTED TIME slots, the operator scrolls to the next unused slot by using the NEXT SELECTED TIME SLOT button 116 and selects the CHANGE TIME button 122 to enter in the desired time.

It should be noted that a copy quality adjustment, even in a relatively complex color machine, may be approximately two minutes. Yet, a two minute interruption in the middle of a job or even between jobs is often unsatisfactory to an operator and the general operation of a print machine or reproduction center. It should also be noted that the adjustments can be adapted to a wide variety of specific machines or to a machine environment such as a plurality of different machines on a network. Machine performance is measured against standards of expected quality. Obviously, these standards can vary from machine to machine. It should be noted, however, that the scope of the instant invention is applicable to any machine environment and to any type of reproduction operation. The essence of the invention is that the periodic analysis of copy quality and adjustment of the machine based upon copy quality is programmable and can be preset to satisfy the requirements of a particular machine or operating environment. As shown in FIG. 4, an optional CQ adjust button 128 is in phantom. It is within the scope of the present invention also to invoke alternate CQ adjust procedures. For example, the operator may specify an extensive adjustment procedure at night and more routine adjustments during the day.

Figure 5:
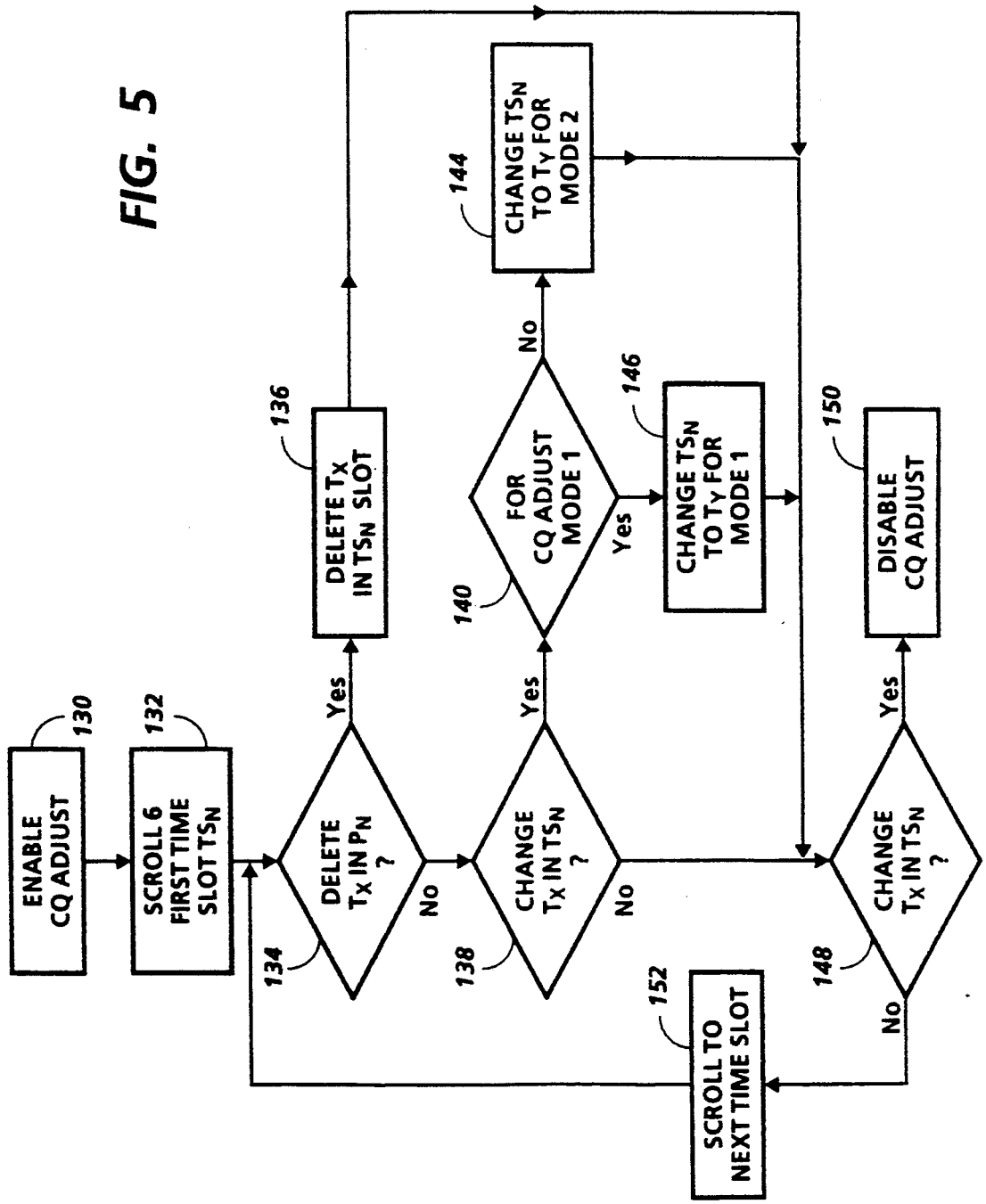
FIG. 5 is a flow chart illustrating the programming of copy quality adjustment in accordance with the present invention.

With reference to FIG. 5, there is illustrated a typical scenario for copy quality programming in accordance with the present invention. As illustrated at block 130, there is an enable copy quality adjust. As stated above, this is any suitable switch or button to place the machine control into a copy quality adjust status. In a copy quality adjust status, the operator would be provided with a screen display such as shown in FIG. 4, displaying at 114 preset times in certain time slots or blank time slots. At 132 the operator scrolls with button 116 through the time slots highlighting each time slot as illustrated at 118.

At decision block 134, assuming a time has already been preset in the time slot, the operator would make a decision whether or not to make a decision whether or not to delete the time $T_x$ in a given slot $TS_n$. If the operator determines to delete the particular time $T_x$ from the time slot $TS_n$, the operator merely strikes the delete time button 120 to delete the time as illustrated at 136. If on the other hand, the operator does not want to delete the time $T_x$ but rather change the time in the time slot $T S_n$, this decision is illustrated at block 138. At decision blocks 140 and 142, the operator determines which mode of copy quality adjust is to be effected by the time change. As discussed above, the scope of the present invention is to cover more than one mode of copy quality adjust. For example, there may be one mode of copy quality adjust that is less extensive and thorough and, therefore, more properly performed at more frequent intervals. If, the operator selects copy adjust mode 1, then as illustrated at block 146, the operator changes the time in time slot $TS_n$ to $T_y$. On the other hand, at block 144, the operator indicates copy adjust mode #2 by striking a suitable mode #2 button such as shown at 128 for a new time $T_y$ for time slot $TS_n$.

After a determination for a particular time slot has been determined, for example, to delete the time, to change the time, or to leave the time slot unchanged, there is a decision block 148 as to whether or not the last time slot has been scrolled. If not, as illustrated at block 150 there is a scroll to the next time slot and the cycle is repeated as necessary to complete changes for each of the desired time slots. It should be noted that at any time in the cycle, by striking button 124, the operator can exist the CQ time programming state and return to machine operation.

By providing the customer with the option to select the times and even the type of machine copy quality check, allows the customer the maximum productivity with the minimum impact on machine performance. Typical scheduled copy quality adjust times might be during lunch hours, break hours, or during times of known inactivity. It is also within the scope of the present invention to delay or hold off a performance of a copy quality check for a given period or "window" of time to conform with the scheduled time, thus, even though a copy quality check may determine that copy quality has deteriorated to the point where a copy quality adjustment is almost immediately necessary, it still may be possible to delay the copy quality check for a certain period of time. For example, if at 2:15 PM the machine determines that a copy quality check was necessary, but the customer had programmed a copy quality check for 10:15 AM, 12:00 PM, and 2:30 PM, the machine could delay a copy quality check until the 2:30 scheduled time.

While the invention has been described with reference to the structure disclosed, it is not confined to the details set forth, but it is intended to cover such modifications or changes as may come within the scope of the following claims.

I claim:

1. In an image processing apparatus having image processing components for forming images on a medium, a controller for directing the operation of the image processing components including a user interface with display screen and an image quality monitoring element for checking the operation of the machine in relation to image quality standards, the method of presetting time for the initiation of the checking of the machine in relation to image quality standards by the image quality monitoring element comprising the steps of:

provide a frame on the display screen having a window for displaying a plurality of time slots, scrolling through said time slots and highlighting selected time slots, entering a time indicator into selected time slots to set the checking of the machine by the image quality monitoring element, storing said time indicators for the checking of the machine by the image quality monitoring element in the controller, and responding to said time indicators to activate the image quality monitoring element to initiate the checking of the machine in relation to image quality standards.

2. The method of claim 1 including the step of deleting a time indicator from a selected time slot.

* * * * *